UNITED STATES PATENT OFFICE.

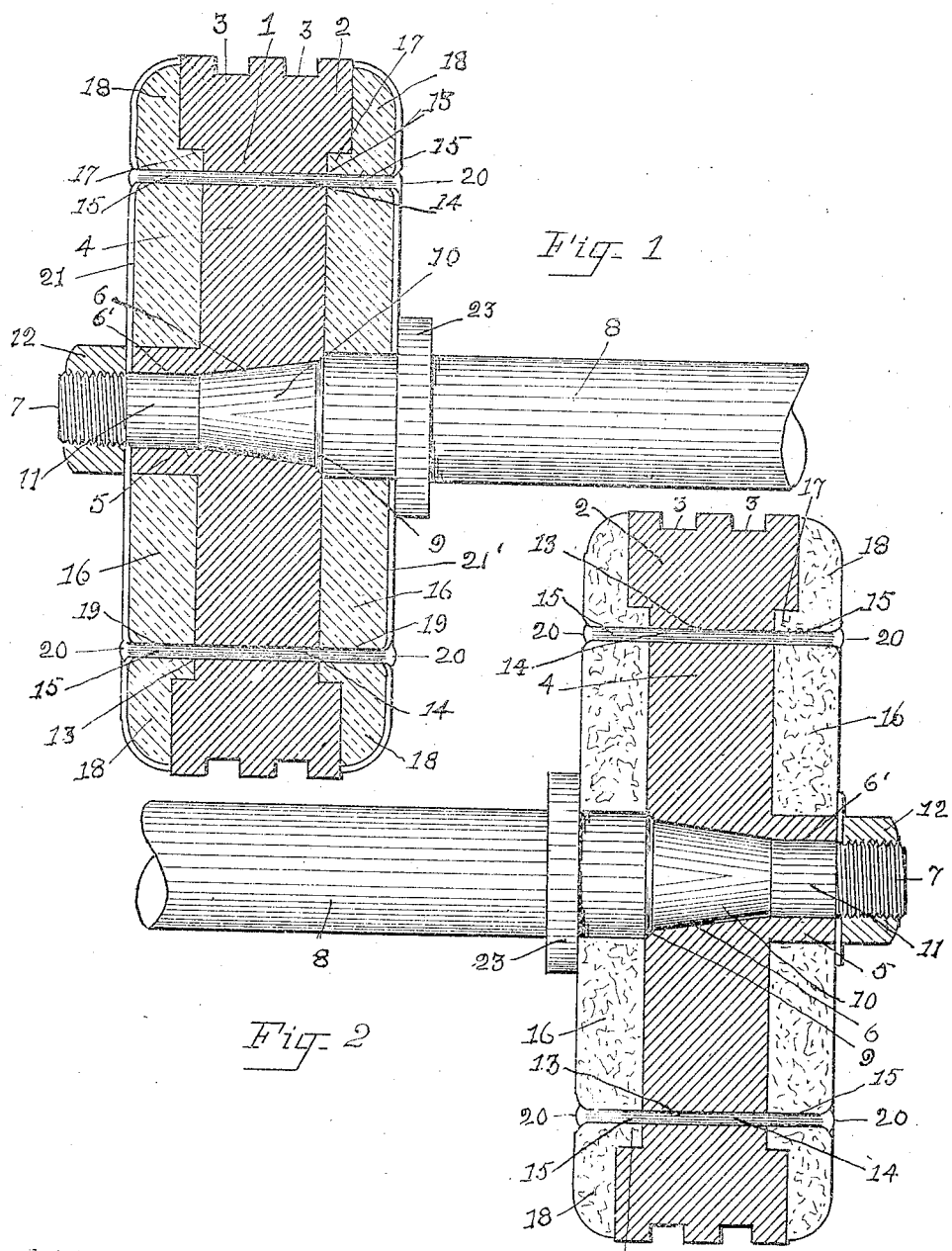

FERDINAND A. PRITSCHAU, OF TOLEDO, OHIO, ASSIGNOR OF ONE-FOURTH TO ROBINSON BELL AND ONE-FOURTH TO WM. ERNEST HANSON, OF TOLEDO, OHIO.

INSULATING-PISTON FOR STEAM-ENGINES.

No. 925,224.      Specification of Letters Patent.      Patented June 15, 1909.

Application filed March 12, 1909. Serial No. 482,981.

*To all whom it may concern:*

Be it known that I, FERDINAND A. PRITSCHAU, a citizen of the United States, residing at Toledo, in the county of Lucas and State of Ohio, have invented a new and useful Improvement in Insulating-Pistons for Steam-Engines, of which the following is a specification.

My invention relates to the piston of a steam engine.

The piston of a double acting engine, in effect, divides the cylinder into two vessels of inversely variable capacity, which are alternately filled and emptied, and the ordinary metallic piston, by reason of its capacity for absorbing heat, may also be likened to a vessel which is successively filled and partly emptied after each filling, the filling "substance" in this case being heat absorbed from the live steam and emptied into the exhaust, by reason of the drop in temperature that occurs when the exhaust port is opened, and due to the expansion which then follows. The energy thus absorbed by the piston from the live and active steam and transmitted into the exhaust is a loss and waste of a very considerable percentage of the energy that is admitted to the cylinder on each stroke, and that in the aggregate amounts to a great reduction in the efficiency of the engine to utilize the energy stored in the boiler steam. This loss is entirely distinct from the loss resulting from the absorption of heat by the cylinder walls, and the jacketing of the cylinder that is resorted to to prevent the latter, has little or no effect to prevent the loss that arises from the absorption of heat from the live steam and its transmission or returning to the exhaust, by the piston.

The object of my invention is to provide a piston for steam engines with shields of low conductivity, whereby the loss due to absorption as set forth is reduced to a minimum, and with these objects in view, my invention broadly consists in facing the pressure areas of the piston with coverings of low conductivity, whereby when the piston once becomes raised to the temperature of the live or active steam, it substantially remains at such temperature, and is but little affected by the sudden drops of temperature of the steam due to its release and expansion, whereby the energy of the live or active steam is reduced but little by the absorption of heat from the steam by the piston at the beginning of each stroke, and its transmission to the exhaust by its flow from the piston on the return stroke, or by the transference of heat through the piston from one side to the other.

It further consists in the construction and combination of parts as hereinafter described and illustrated in the drawings in which—

Figure 1 is a diametric section of a piston, equipped in accordance with my invention, with protected low conductive shields. Fig. 2 is a similar view showing the piston equipped with unprotected shields.

In the drawings 1 designates the metallic body portion of a piston, comprising an annular rim portion 2 provided with grooves 3 to receive the packing rings, (not shown); and having an annular recessed portion 4 of reduced thickness concentric to the rim, and provided with a hub portion 5 projecting axially from one side.

The body 1 is provided with a conically tapered axial bore 6, which is extended by a cylindrical bore 6',—of a diameter equal to the least diameter of the conical bore 6,—through the hub 5, and the outer end of the bore 6 opposite the hub 5, is countersunk. In the bores thus formed is fitted the end portion 7 of a piston rod 8, the end portion 7 having a conical shoulder 9 to fit into the countersink, a tapered portion 10 to fit into the conical bore 6, and a cylindrical portion 11 extending through the bore 6' of the hub, and having its outer end portion threaded to receive thereon a nut 12, when the piston rod is secured in the body 1 of the piston.

The recessed portion 4 of the body 1 is provided at regular intervals with an annular series of bolt holes 13, concentric to the piston rod, and in the bolt holes are tightly fitted the bolts 14, having end portion 15 projecting equal distances from opposite sides of the portion 4.

Upon the sides of the body 1 are mounted and fitted the annular insulating disks 16 having axial bores respectively, adapted on the one side to receive the hub 5, and on the other side the body of the piston rod 8. The central portion of the disks 16 are of increased thickness, forming annular shoulder projections 17 adapted to fill in the recesses of the body 1, and abut the recessed body portions 4, with the rim portions 18 abutting the rim 2 of the body 1. The disks are of slightly less diameter than the rim 4 of the body 1 of the piston, and the outer faces of the disks are slightly rounded into the peripheries of the disks. The disks 16 are provided with bolt holes 19 to receive the end portions 15 of the rivet bolts 14, and the holes 19 are countersunk at the outer sides of the disks to receive the rivet heads 20 formed thereon after the disks are mounted on the body of the piston. In Fig. 1 I have shown the disks 16 formed of glass,—preferably either toughened, wire, or quartz glass,—and where glass is used I prefer to provide thin outer plates 21 and 21' of sheet metal, press drawn and cup shaped, to fit over and receive the outer portions of the disks and extend over their peripheries, and between the disks and the body of the piston, and between the disks and the caps, are interposed thin sheets of asbestos or the like, to form cushions for the glass. The joints between should also be filled with cement to render them impervious to steam. The plate 21 is provided with an enlarged axial orifice of a diameter to receive the piston rods, and is also centrally secured by a collar 23, shrunk or otherwise secured on the piston.

While the protecting plates 21 and 21', by reason of their conductivity, lessen in some degree the efficiency of the disks 16, the thinness of the plates limits their capacity of absorption and the number of units of heat that are lost through their use is small as compared with the loss that occurs from the naked piston.

In Fig. 2, the piston body 1 is shown provided with disks 16 of compressed fiber, of wood, asbestos, etc., which are of like form as the glass disks shown in Fig. 1. However, for disks of this or any other material, the plates 21 and 21' may be omitted, where the character of the material permits of their use without protecting plates.

By equipping a piston with low conductive disks or coverings as described, the power and efficiency of the engine is increased, and the loss of energy due to the substantially continuous absorption of heat from the live steam and its return or transference to the exhaust steam, by the piston, is reduced to a minimum.

It is manifest that the principle of construction herein described, may be advantageously applied to pistons of other heat motors, and I therefore do not limit myself to its application to pistons of steam engines only.

What I claim to be new is—

1. In a piston for steam engines and the like, the combination with the metallic body of the piston, of low conductive coverings for the pressure areas of the body, substantially as and for the purpose set forth.

2. In a piston for steam engines and the like, the combination with the metallic body of the piston, of disks composed of low conductive material and covering the pressure faces of the piston body, substantially as and for the purpose set forth.

3. In a piston for steam engines and the like, the combination with the metallic body of the piston, of low conductive disks, secured to and covering the pressure faces of the body, said disks being provided with sheet metal protecting caps, substantially as and for the purpose set forth.

In witness whereof I have hereunto signed my name in the presence of two subscribing witnesses, this 4th day of March, 1909.

FERDINAND A. PRITSCHAU.

In presence of—
WM. J. FRITSCHE,
M. S. SMITH.